United States Patent
Suzuki

(10) Patent No.: US 8,050,812 B2
(45) Date of Patent: *Nov. 1, 2011

(54) VEHICLE QUALITY ANALYZING SYSTEM AND DATA MANAGEMENT METHOD

(75) Inventor: Yoshio Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 729 days.

This patent is subject to a terminal disclaimer.

(21) Appl. No.: 11/885,075

(22) PCT Filed: Sep. 27, 2005

(86) PCT No.: PCT/JP2005/017774
§ 371 (c)(1),
(2), (4) Date: Aug. 24, 2007

(87) PCT Pub. No.: WO2006/090503
PCT Pub. Date: Aug. 31, 2006

(65) Prior Publication Data
US 2008/0161992 A1    Jul. 3, 2008

(30) Foreign Application Priority Data
Feb. 24, 2005   (JP) ................. 2005-048390

(51) Int. Cl.
*G01M 17/00*    (2006.01)
(52) U.S. Cl. ............. 701/29; 701/33; 707/899; 715/703
(58) Field of Classification Search ............. 701/29, 701/33
See application file for complete search history.

(56) References Cited

U.S. PATENT DOCUMENTS
2003/0050747 A1 * 3/2003 Kamiya .................. 701/33

FOREIGN PATENT DOCUMENTS
| JP | 05-126685 | * | 5/1993 |
| JP | 5-126685 A | | 5/1993 |
| JP | 2002-041130 | * | 2/2002 |
| JP | 2002-041130 A | | 2/2002 |
| JP | 2004-028864 A | | 1/2004 |
| JP | 2004-038635 A | | 2/2004 |

* cited by examiner

*Primary Examiner* — Mark Hellner
*Assistant Examiner* — Helal A Algahaim
(74) *Attorney, Agent, or Firm* — Arent Fox LLP

(57) ABSTRACT

The file name (75) of a second data file is included in a first data file (32a). A position information data (76) is likewise included in the first data file (32a) for specifying the position of specific data in the second data file. A processing unit obtains the specific data from the second data file based on the description in the first data file. Specific instructions are supplied to a quality analyzing apparatus in a vehicle quality analyzing system based on the obtained data. The quality analyzing apparatus supplies electronic apparatuses or devices in a vehicle with predetermined signals in response to the specific instructions, so as to analyze the quality of the vehicle based on responses from the electronic apparatuses or devices. A set of independent files is utilized to establish the data structure. Data can be changed or modified in the individual file in a facilitated manner.

6 Claims, 12 Drawing Sheets

| Row No. | Retrieval MTO-list-file Name | VIN read from Vehicle YES(1)/NO(0) | Retry reading VIN | Communication w/QA Equip. YES(1)/NO(0) | Wait QA Communication | Retry QA Communication | Display Data disp-1 | Display Data disp-2 |
|---|---|---|---|---|---|---|---|---|
| 0 | ABC_MTO_list_USA.xxx | 1 | 2 | 1 | 5 | 4 | Select MTO | Selected MTO |
| 1 | ABC_MTO_list_JPN.xxx | 1 | 2 | 1 | 5 | 4 | MTOを選択して下さい | 選択済みのMTO |
| 2 | ABC_MTO_list_CHN.xxx | 1 | 2 | 1 | 5 | 4 | (Chinese) | (Chinese) |
| 3 | ABC_MTO_list_POR.xxx | 1 | 2 | 1 | 5 | 4 | (Portuguese) | (Portuguese) |
| 4 | ABC_MTO_list_SPN.xxx | 1 | 2 | 1 | 5 | 4 | (Spanish) | (Spanish) |
| 5 | ... | ... | ... | ... | ... | ... | ... | ... |

FIG.3

| Row No. (45) | Retrieval MTO-list-file Name (46) | Retrieval VIN-list-file Name (47) | Wait QA Communication | Retry QA Communication | Display Data disp-1 | Display Data disp-2 |
|---|---|---|---|---|---|---|
| 0 | ABC_MTO_list_USA.xxx | ABC_VIN_list_USA.xxx | 5 | 4 | Select MTO | Change |
| 1 | ABC_MTO_list_JPN.xxx | ABC_VIN_list_JPN.xxx | 5 | 4 | MTOを選択して下さい | 変更 |
| 2 | ABC_MTO_list_CHN.xxx | ABC_VIN_list_CHN.xxx | 5 | 4 | (Chinese) | (Chinese) |
| 3 | ABC_MTO_list_POR.xxx | ABC_VIN_list_POR.xxx | 5 | 4 | (Portuguese) | (Portuguese) |
| 4 | ABC_MTO_list_SPN.xxx | ABC_VIN_list_SPN.xxx | 5 | 4 | (Spanish) | (Spanish) |
| 5 | ... | ... | ... | ... | ... | ... |

| Row No. 49 | Execute YES(1)/NO(0) | Manual Start 51 Display Data/Languages | 52 Retrieval File Name | 53 Row Indications | Execute YES(1)/NO(0) 27 | Automatic Start 54 Display Data/Languages | 55 Retrieval File Name | 56 Row Indications |
|---|---|---|---|---|---|---|---|---|
| 0 | 1 | Manual Start | manual_start.xxx | 0 | 1 | Automatic Start | auto_start.xxx | 0 |
| 1 | 1 | マニュアル起動 | manual_start.xxx | 1 | 1 | オート起動 | auto_start.xxx | 1 |
| 2 | 1 | (Chinese) | manual_start.xxx | 2 | 1 | (Chinese) | auto_start.xxx | 2 |
| 3 | 1 | (Portuguese) | manual_start.xxx | 3 | 1 | (Portuguese) | auto_start.xxx | 3 |
| 4 | 1 | (Spanish) | manual_start.xxx | 4 | 1 | (Spanish) | auto_start.xxx | 4 |
| 5 | … | … | manual_start.xxx | 5 | … | … | auto_start.xxx | 5 |

26

| Inspection Root Data | Row Indication |
|---|---|
| ABC_inspection_cont_file.xxx | 0 |

ABC_MTO_list_USA.xxx

| MTO List |
|---|
| ABC-001-A |
| ABC-001-B |
| ABC-001-C |
| ABC-002-A |
| ABC-002-B |
| ABC-002-C |
| ABC-002-D |

ABC_VIN_list_USA.xxx

| VIN List |
|---|
| 1ABCD12345-200.xxx |
| 1ABCD12346-200.xxx |
| 1ABCD22346-200.xxx |
| 1ABCD22346-100.xxx |
| 1ABCD20346-100.xxx |
| 1ABCD29346-100.xxx |
| 1ABCD32346-100.xxx |

| Row No. | Precondition Eng_SP rpm | Precondition EGR open % | Precondition ECT degree C | Criteria MIN down Eng rpm | Criteria MAX down Eng rpm | | Comment |
|---|---|---|---|---|---|---|---|
| 0 | 1000 | 25 | 68 | -300 | -350 | ! | debug |
| 1 | 1100 | 32 | 72 | -310 | -360 | ! | standard |
| 2 | 1080 | 28 | 70 | -310 | -340 | ! | spring |
| 3 | 1040 | 30 | 72 | -310 | -340 | ! | summer |
| 4 | 1090 | 28 | 70 | -320 | -360 | ! | autumn |
| 5 | 1110 | 26 | 68 | -320 | -360 | ! | winter |
| 6 | | | | | | | |
| 7 | | | | | | | |
| 8 | | | | | | | |

VEHICLE QUALITY ANALYZING SYSTEM AND DATA MANAGEMENT METHOD

CROSS-REFERENCE TO RELATED APPLICATION

This application is a National Stage entry of International Application No. PCT/JP2005/017774, filed Sep. 27, 2005, the entire specification claims and drawings of which are incorporated herewith by reference.

TECHNICAL FIELD

The present invention relates to a vehicle quality analyzing system utilized to analyze the quality of the vehicle. In particular, the invention relates to a data management method incorporated into the vehicle quality analyzing system.

BACKGROUND ARTS

A vehicle quality analyzing system is well known. The vehicle quality analyzing system is utilized to analyze the quality of vehicles shipped out of a factory, for example. The vehicle quality analyzing system is designed to realize the process of analysis in accordance with a predetermined software. The vehicle quality analyzing system receives various data, required to realize the process of analysis, for the individual vehicle.
[Related Art] JP Patent Publication No. 2844252
[Related Art] JP Patent Application Publication No. 7-333110
[Related Art] JP Patent Publication No. 3345829
[Related Art] JP Patent Publication No. 3331112
[Related Art] JP Patent Publication No. 3360635
[Related Art] U.S. Pat. No. 4,831,560
[Related Art] U.S. Pat. No. 4,694,408

DISCLOSURE OF THE INVENTION

Data should be changed or modified in the aforementioned vehicle quality analyzing system depending on the type of vehicle, the specifications of vehicle, seasonal elements, and the like, for example. The software should be modified to update data. The software is modified too often.

It is accordingly an object of the present invention to provide a vehicle quality analyzing system capable of easily accepting the variety of type, the variety of specifications, seasonal changes, and the like.

According to a first aspect of the present invention, there is provided a vehicle quality analyzing system comprising: a first storage apparatus holding a first data file prepared based on a software; a second storage apparatus holding a second data file prepared based on a software, the second data file including a plurality of data; a processing unit generating specific instructions based on the first and second data files; and a quality analyzing apparatus supplying an electronic apparatus in a vehicle with a predetermined signal based on the specific instructions of the processing unit, the quality analyzing apparatus analyzing the quality of the vehicle based on a response from the electronic apparatus, wherein the processing unit obtains from the first data file an identifier for the second data file and a position information data specifying the position of a specific data in the second data file in accordance with a predetermined rule.

The vehicle quality analyzing system allows utilization of a set of independent files for establishment of the data structure. Only a description in a single file is utilized to establish the relationship of data between a plurality of files. A multilayered data structure can be established in a relatively facilitated manner.

Moreover, the vehicle quality analyzing system allows separate management of data in the individual file. Only the target file may be opened for change or modification of data. Since the individual file may have a data volume of a relatively small amount, the operator is allowed to enjoy a reduced working operation. On the other hand, if the individual data is incorporated in a software program file in a conventional manner, it is troublesome for the operator to even find out a target data to be subjected to a change in the software program file.

In this case, the software utilized to prepare the first data file may be identical to the software utilized to prepare the second data file. This utilization of the common software enables a further facilitation in the management of data. The vehicle quality analyzing system allows management of data based on a so-called spreadsheet in a file. A general-purpose database or spreadsheet software may be employed to manage the file, for example. Employment of a software of this type provides the operator with an accustomed user interface, so that the first and second data files can be prepared in a facilitated manner.

The processing unit may determine at least one program file based on an identifier included in the first data file. In this case, when the processing unit processes the program file, the processing unit may utilizes the specific data in the second data file. Data is in this manner managed separately for the individual program file.

The first data file and/or the second data file are preferably formed in a manner overwritable based on the software in the vehicle quality analyzing system. A general-purpose database software may be employed as the software in the aforementioned manner.

According to a second aspect of the invention, there is provided a data management method comprising: opening a first data file prepared based on a software; obtaining from the first data file an identifier for a second data file prepared based on a software; obtaining from the first data file a position information data specifying the position of a specific data in the second data file in accordance with a predetermined rule; and obtaining the specific data from the second data file based on the identifier and the position information data.

The data management method allows utilization of a set of independent files for establishment of the data structure in a manner described above. Only a description in a single file is utilized to establish the relationship of data between a plurality of files. A multilayered data structure can be established in a relatively facilitated manner. Moreover, the vehicle quality analyzing system allows separate management of data in the individual file. The operator is allowed to enjoy a reduced working operation in changing data. This data management method greatly contributes to establishment of the aforementioned vehicle quality analyzing system.

In this case, the software utilized to prepare the first data file may be identical to the software utilized to prepare the second data file. In addition, the data management method may further comprise: obtaining from the first data file an identifier for a program file; executing the program file based on the identifier; and utilizing the specific data in the second data file in the execution of the program file. These additional processes greatly contribute to establishment of the aforementioned vehicle quality analyzing system.

A specific data management program may be provided to realize the aforementioned data management method. The data management program may comprise program instructions causing a processor to: open a first data file prepared based on a software; obtain from the first data file an identifier for a second data file prepared based on a software; obtain from the first data file a position information data specifying the position of a specific data in the second data file in accordance with a predetermined rule; and obtain the specific data from the second data file based on the identifier and the position information data.

BRIEF DESCRIPTION OF THE DRAWINGS

FIG. 3 is a schematic view illustrating the structure of a manual starting control file.

FIG. 4 is a schematic view illustrating the structure of an automatic starting control file.

FIG. 5 is a schematic view illustrating the structure of a main control file.

FIG. 6 is a schematic view illustrating the structure of a root data file.

FIG. 7 is a schematic view illustrating the structure of a list file including the list of "Model Type Option Code Number".

FIG. 8 is a schematic view illustrating the structure of a list file including the list of "Vehicle Identification Number".

FIG. 9 is a schematic view illustrating the structure of a parameter file.

BEST MODE FOR CARRYING OUT THE INVENTION

Figure 1:
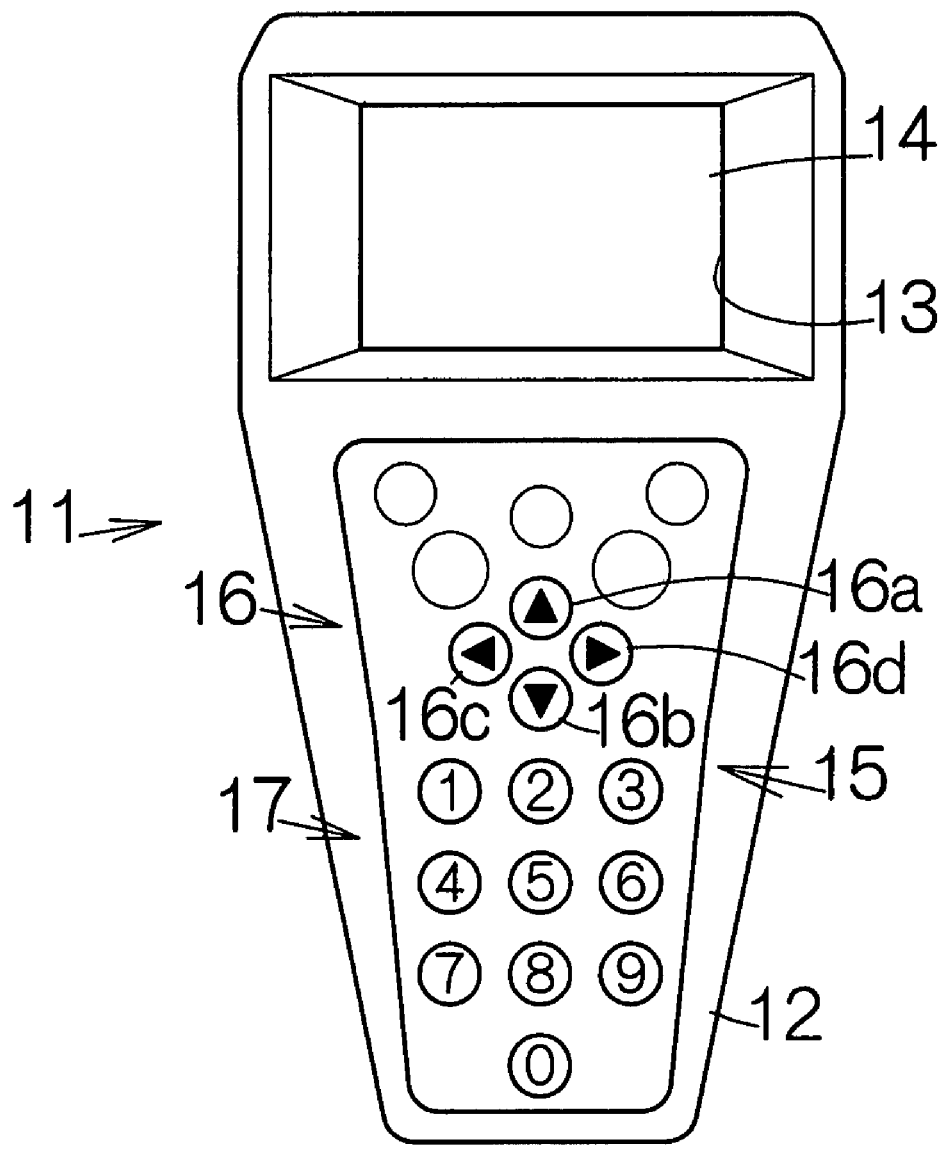
FIG. 1 is a plan view schematically illustrating a handy terminal utilized in a vehicle quality analyzing system.

FIG. 1 schematically illustrates a handy terminal utilized in a vehicle quality analyzing system according to the present invention. The handy terminal 11 includes an enclosure 12 enclosing a central processing unit, CPU, and other electronic devices. A window opening 13 is defined in the front surface of the enclosure 12. The window opening 13 is designed to expose the screen of a display apparatus 14. Various texts and graphics appear on the screen of the display apparatus 14 based on the processing of the CPU.

An input device 15 is embedded in the front surface of the enclosure 12. The input device 15 includes a so-called cross-keypad 16 and a ten-keypad 17, for example. The cross-keypad 16 includes an upward keypad 16a and a downward keypad 16b respectively corresponding to the upward direction and the downward direction on the screen of the display apparatus 14 as well as a leftward keypad 16c and a rightward keypad 16d respectively corresponding to the leftward direction and the rightward direction on the screen of the display apparatus 14, in a conventional manner. The operator of the handy terminal 11 manipulates the cross keypad 16 to scroll images on the screen in the upward direction and the downward direction and to move a cursor in the upward, downward, leftward and rightward directions on the screen.

The ten-keypad 17 includes ten digit keypads respectively corresponding to ten digits, 1-9 and 0. Some alphabetical characters are also allocated to the individual digit keypad. The operator of the handy terminal 11 manipulates the ten-keypad 17 to input numerical and alphabetical characters to the CPU.

Figure 2:
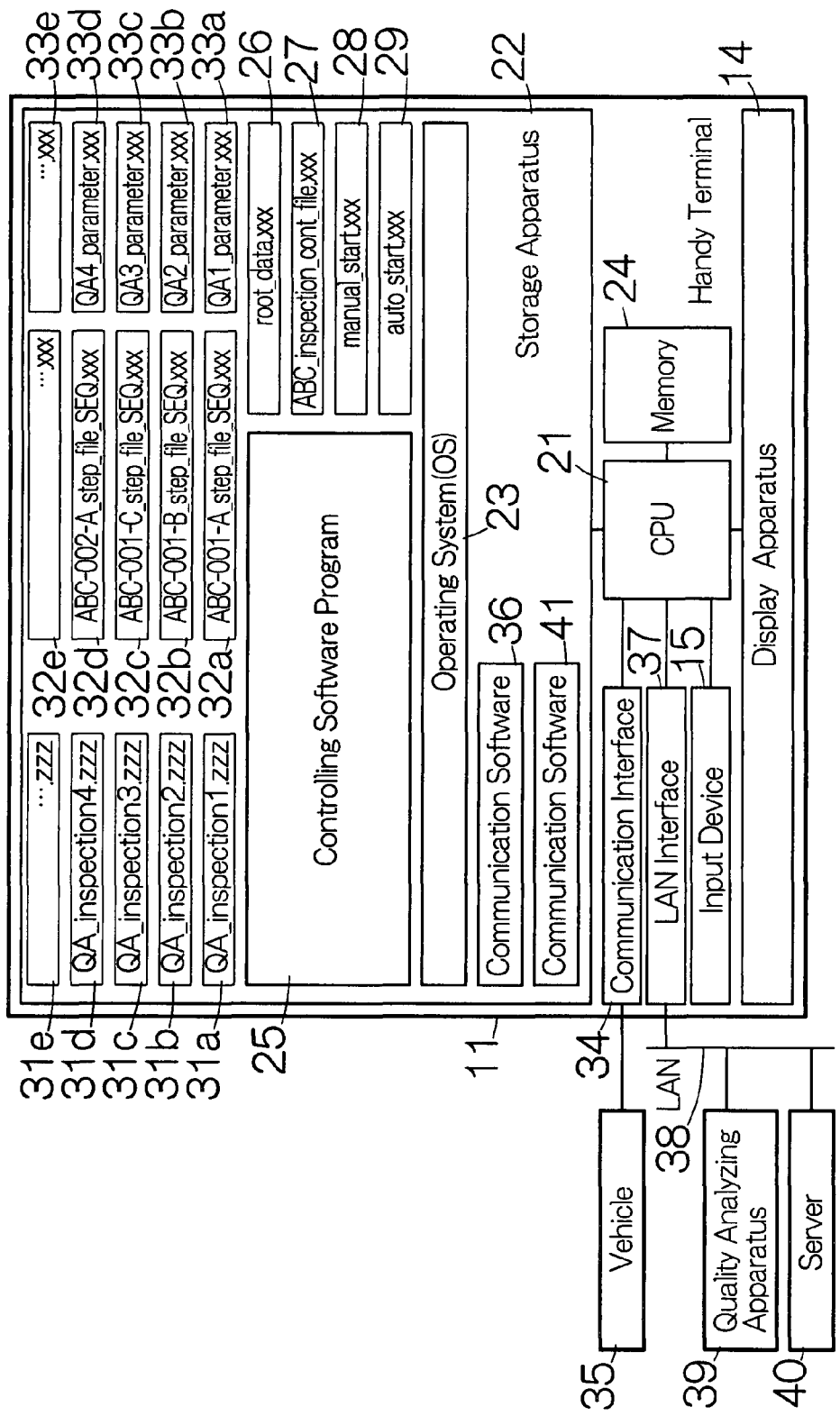
FIG. 2 is a block diagram schematically illustrating the structure of the vehicle quality analyzing system.

As shown in FIG. 2, the handy terminal 11 includes the aforementioned CPU 21. A storage apparatus 22, such as a hard disk drive, HDD, a flash memory of large capacity, or the like, is connected to the CPU 21. An operating system, OS, 23 is stored in the storage apparatus 22, for example. When the handy terminal 11 is switched on, the CPU 21 executes the operating system 23. The CPU 21 is designed to force a memory 24 to temporarily hold the operating system 23 when the CPU 21 executes the operating system 23, for example.

A controlling software program 25 according to the present invention is stored in the storage apparatus 22. When the controlling software program 25 is executed at the CPU 21, a vehicle quality analyzing method is carried out, as described later in detail. The CPU 21 utilizes in the vehicle quality analyzing method a root data file 26, a main control file 27, a manual starting control file 28, an automatic starting control file 29, inspecting software program files 31a, 31b, 31c, 31d, 31e, . . . , process sequence files 32a, 32b, 32c, 32d, 32e, . . . and parameter files 33a, 33b, 33c, 33d, 33e, . . . all stored in the storage apparatus 22. Those files 26-29, 31a-31e . . . , 32a-32e . . . , 33a-33e . . . will be described later in detail. The boot-up of the operating system 23 is accompanied with the start-up of the controlling software program 25.

A communication interface 34 is connected to the CPU 21. The communication interface 34 allows exchange of data between the CPU 21 and a vehicle 35. The CPU 21 executes a communication software program for the realization of the communication. The CPU 21 obtains the communication software program 36 from the storage apparatus 22 for the realization of the communication. The communication may be established through wire or cable, for example. Alternatively, the communication may employ a radio communication.

A local area network (LAN) interface 37 is likewise connected to the CPU 21. The LAN interface 37 serves to establish connection between the CPU 21 and a local area network, LAN, 38. A quality analyzing apparatus 39 and a server 40 are connected to the LAN 38. The LAN 38 serves to establish communication between the CPU 21 and the quality analyzing apparatus 39 as well as between the CPU 21 and the server 40. This communication allows exchange of data between the CPU 21 and the quality analyzing apparatus 39 as well as between the CPU 21 and the server 40. The CPU 21 executes a communication software program for the realization of the communication. The CPU 21 obtains the communication software program 41 from the storage apparatus 22 for the realization of the communication. The communication may be established through wire or cable, for example. Alternatively, the communication may employ a radio communication.

FIG. 3 schematically illustrates the structure of the manual starting control file 28. The manual starting control file 28 includes a database of so-called spreadsheet type. Specifically, the column number and the row number are utilized to specify the position of data in the database. The manual starting control file 28 may be prepared based on the execution of a database software such as Excel® distributed from Microsoft corporation. The row number 42 is utilized to sort the language in the manual starting control file 28. English is assigned to the "Row No. 0", for example. Japanese is likewise assigned to the "Row No. 1. Chinese, Portuguese and Spanish are assigned to the "Row No. 2", the "Row No. 3" and the "Row No. 4", respectively. The assigned language is used to describe data in the items of the identical row. The file name of the manual starting control file 28 includes an extension ".xxx" specific to the database of spreadsheet type. For example, when Excel® is employed as the database software, the file name should include the extension ".xls".

The column is utilized to sort the items in the manual starting control file 28. Here, the file name 43 of a list file including a list of "Model Type Option Code Number (MTO)" is assigned to the first column, for example. The list file will be described later in detail. The list file is prepared for the individual language in the aforementioned manner. Material image data 44 is assigned to the columns after the sixth column. The language assigned to the row number 42 is used to specify or establish the material image data 44 in the corresponding row. An identical meaning or content is established for the material image data 44 in the identical column.

FIG. 4 schematically illustrates the structure of the automatic starting control file 29. The automatic starting control file 29 similarly includes a database of so-called spreadsheet type. The automatic starting control file 29 may be prepared based on the execution of a database software identical to that utilized to prepare the manual starting control file 28. The row number 45 is utilized to sort the language in the manual automatic starting control file 29. English is assigned to the "Row No. 0", for example. Japanese is likewise assigned to the "Row No. 1. Chinese, Portuguese and Spanish are assigned to the "Row No. 2", the "Row No. 3" and the "Row No. 4", respectively. The assigned language is used to describe data in the items of the identical row. The file name of the automatic starting control file 29 includes an extension ".xxx" specific to the database of spreadsheet type.

The column is utilized to sort the items in the automatic starting control file 29. Here, the file name 46 of the list file including the list of "Model Type Option Code Number (MTO)" is assigned to the first column, for example. The file name 47 of a list file containing a list of "Vehicle Identification Number (VIN)" is assigned to the second column, for example. The list file will be described later in detail. The list file is prepared for the individual language in the aforementioned manner. Otherwise, material image data 48 is assigned to the columns after the fourth column. The language assigned to the row number 45 is used to specify or establish the material image data 48 in the corresponding row. An identical meaning or content is established for the material image data 48 in the identical column.

FIG. 5 illustrates the structure of the main control file 27. The main control file 27 similarly includes a database of so-called spreadsheet type. The main control file 27 may be prepared based on the execution of a database software identical to that utilized to prepare the manual starting control file 28 and the automatic starting control file 29. The row number 49 is utilized to sort the language in the main control file 27. English is assigned to the "Row No. 0", for example. Japanese is likewise assigned to the "Row No. 1. Chinese, Portuguese and Spanish are assigned to the "Row No. 2", the "Row No. 3" and the "Row No. 4", respectively. The assigned language is used to describe data in the items of the identical row. The file name of the main control file 27 includes an extension ".xxx" specific to the database of spreadsheet type.

Four columns form a dataset in the main control file 27, for example. The first four columns include data in the individual language in connection with the manual starting control file 28. Here, material image data 51, the file name 52 of the manual starting control file 28 and the column number 53 are specified in the individual row. As is apparent from the aforementioned description, the row number 53 serves to determine the specific language in the manual starting control file 28. The file name 52 is identical to all the language. The next four columns include data in the individual language in connection with the automatic starting control file 29. Here, material image data 54, the file name 55 of the automatic starting control file 29 and the column number 56 are specified in the individual row. As is apparent from the aforementioned description, the row number 56 serves to determine the specific language in the automatic starting control file 29. The file name 55 is identical to all the language.

FIG. 6 illustrates the structure of the root data file 26. The root data file 26 includes the file name 57 of the main control file 27 and the associated row number 58. As is apparent from the aforementioned description, the row number 58 serves to determine the specific language in the main control file 27. The root data file 26 is prepared based on the execution of the controlling software program 25.

FIG. 7 schematically illustrates the structure of the aforementioned list file 59 including the list of "Model Type Option Code Number" of a vehicle or vehicles acceptable to the aforementioned quality analyzing apparatus 39. The Model Type Option Code Number is utilized to identify the model of the vehicle, the type of the vehicle and the setting of the option. FIG. 8 schematically illustrates the structure of the aforementioned list file 61 including the list of "Vehicle Identification Number". The list file 61 includes the list of the Vehicle Identification Number assigned to the vehicles 35. The list files 59, 61 are stored in the storage apparatus 22.

FIG. 9 illustrates the structure of the parameter files 33*a*-33*e*. The individual parameter file 33*a*-33*e* includes a database of so-called spreadsheet type. Specifically, the column number and the row number are utilized to specify the position of the data in the database. The parameter files 33*a*-33*e* may be prepared based on the execution of a database software identical to that utilized to prepare the manual starting control file 28, the automatic starting control file 29 and the main control file 27. The row number 62 serves to sort a set of parameters in the parameter files 33*a*-33*e*. When the specific inspecting software program file 31*a*, 31*b*, 31*c*, 31*d*, 31*e* is executed, one set of the parameters are used. Here, the parameters 63 are specified in the "Row No. 1" for the "standard version". The parameters 64, 65, 66, 67 are specified in the "Row No. 2", "Row No. 3", "Row No. 4" and "Row No. 5" for different seasons, namely for the "spring version", "summer version", "autumn version" and "winter version", respectively. The parameter files 33*a*-33*e* reflect the variation in the parameters resulting from the seasonal change. The column is utilized to sort the items in the parameter files 33*a*-33*e*. The file name of the parameter files 33*a*-33*e* includes an extension ".xxx" specific to the database of spreadsheet type.

Figures 10, 11:
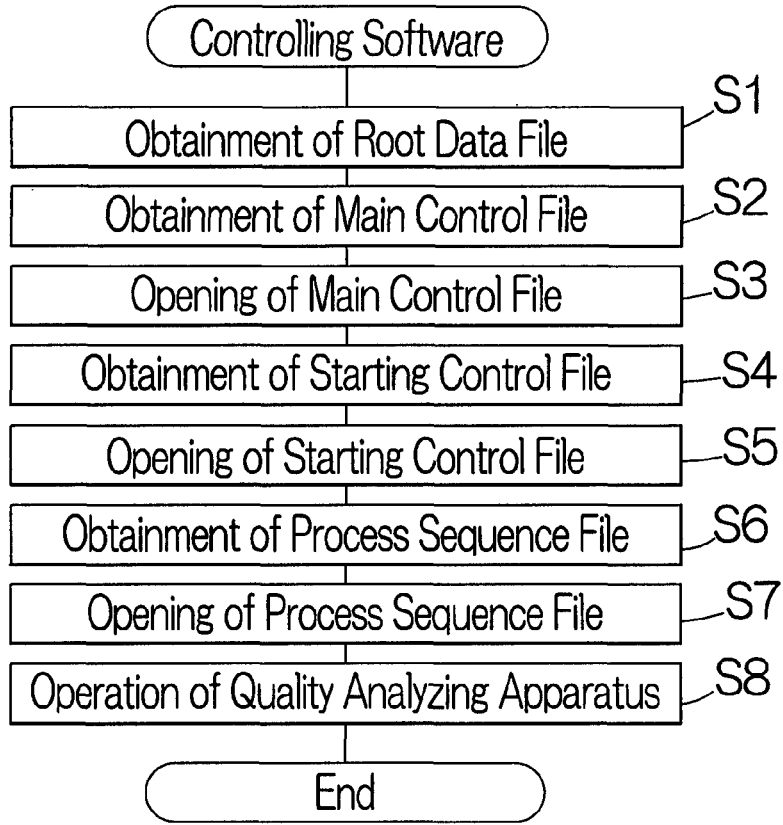
FIG. 10 is a schematic view illustrating the structure of a process sequence file.
FIG. 11 is a flowchart illustrating the procedure of a controlling software.

FIG. 10 illustrates the structure of the process sequence files 32a-32e. The individual process sequence file 32a-32e likewise includes a database of so-called spreadsheet type. The process sequence files 32a-32e may be prepared based on the execution of a database software identical to that utilized to prepare the manual starting control file 28, the automatic starting control file 29, the main control file 27 and the parameter files 33a-33e. The row is utilized to identify the sequence of processes in the process sequence files 32a-32e. The sequence number 68 is assigned to the first column in the process sequence files 32a-32e. The sequence number 68 maybe assigned to a row or a group of rows. Here, the sequence number "$1" is assigned to the second and third rows. A set of data 69 is specified in the second and third rows in relation to the sequence number "$1". Likewise, the sequence numbers "$2", "$3" and "$4" are assigned to the fourth and fifth rows, the sixth and seventh rows, and the ninth and tenth rows, respectively. Sets of data 71, 72, 73 are specified in the fourth and fifth rows, the sixth and seventh rows, and the ninth and tenth rows in connection with the sequence numbers "$2", "$3" and "$4", respectively. The file name of the process sequence files 32a-32e includes an extension ".xxx" specific to the database of spreadsheet type.

The column is utilized to sort the items in the process sequence files 32a-32e. Here, a file name 74 of a "program file" is specified in the third column, for example. A file name 75 is specified in the fifth column for identifying the specific parameter file 33a, 33b, 33c, 33d or 33e used in the "program file" specified in the identical row. The column number 76 is specified in the sixth column for identifying the row number in the parameter file 32a, 32b, 32c, 32d or 32e specified in the identical row. As is apparent from the aforementioned description, the row number 76 serves to determine a specific set of the parameters 63, 64, 65, 66 or 67 in the specific parameter file 33a, 33b, 33c, 33d or 33e. Here, the row of the process sequence file 32a, 32b, 32c, 32d or 32e serves to relate the "Row No. 1" of "QA1 parameter" parameter file to "QA inspection)" program file. The "Row No. 7" of "QA2 parameter" parameter file, the "Row No. 5" of "QA3 parameter" parameter file and the "Row No. 5" of "QA4 parameter" parameter file are respectively related to "QA inspection2" program file, "QA inspection3" program file and "QA inspection4" program file.

Now, when the handy terminal 11 is switched on, the operating system 23 is booted up in the handy terminal 11. The controlling software program 25 is simultaneously booted up. The CPU 21 simultaneously executes the communication software programs 36, 41. The communication interface 34 and the LAN interface 37 stand by in the handy terminal 11.

As shown in FIG. 11, the CPU 21 acquires from the storage apparatus 22 the root data file 26 at step S1. The CPU 21 reads out from the root data file 26 the file name 57 of the main control file 27 and the associated row number 58. The CPU 21 then obtains the designated main control file 27 from the storage apparatus 22 in response to the determination of the file name 57 at step S2. The CPU 21 boots the designated software module based on the extension ".xxx" of the main control file 27. The CPU 21 opens the main control file 27 at step S3. The CPU 21 then selects the designated row number 49 in the main control file 27 based on the row number 58 in the root data file 26. The CPU 21 reads out dataset from the row designated by the selected row number 49.

Figure 12:
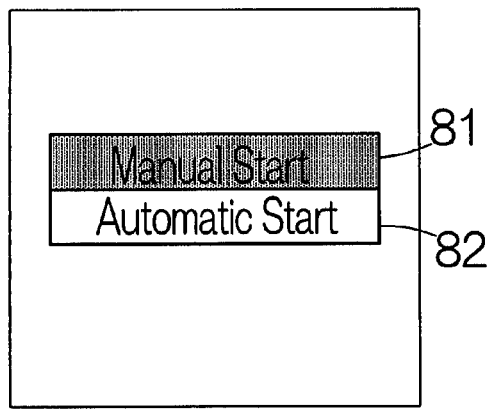
FIG. 12 is a schematic view illustrating an example of an image based on the main control file.

The CPU 21 generates images based on the material image data 51, 54. As shown in FIG. 12, the generated images are displayed on the screen of the display apparatus 14, for example. Here, the "Row No. 0" is selected in the main control file 27, so that all the description appears in English within the screen. The operator is allowed to select an option on the screen. The cross-keypad 16 may be used to select the option, for example.

The CPU 21 obtains from the storage apparatus 22 the starting control file 28 or 29 in accordance with the selection made by the operator at step S4. When "Manual Start" 81 is selected on the screen, for example, the CPU 21 reads out the file name 52 from the main control file 27. The manual starting control file "manual start" 28 is read out based on the determination of the file name 52. In this case, the material data 51, the file name 52, the row number 53, and the like, in the main control file 27 are related to the manipulation of selection. On the other hand, when "Automatic Start" 82 is selected on the screen, the CPU 21 reads out the file name 55 from the main control file 27. The automatic starting control file "auto start" 29 is read out based on the determined file name 55. In this case, the material data 54, the file name 55, the row number 56, and the like, in the main control file 27 are related to the manipulation of selection.

Assume that "Manual Start" 81 is selected on the screen. The CPU 21 obtains the manual starting control file "manual start" 28 from the storage apparatus 22. The CPU 21 boots the designated software module based on the extension ".xxx" of the manual starting control file 28 at step 55. The CPU 21 in this manner opens the manual starting control file "manual start" 28. The CPU 21 then selects the designated row number 42 in the manual starting control file 28 based on the row number 53 in the main control file 27. The CPU 21 reads out dataset from the row designated by the selected row number 42.

Figure 13:
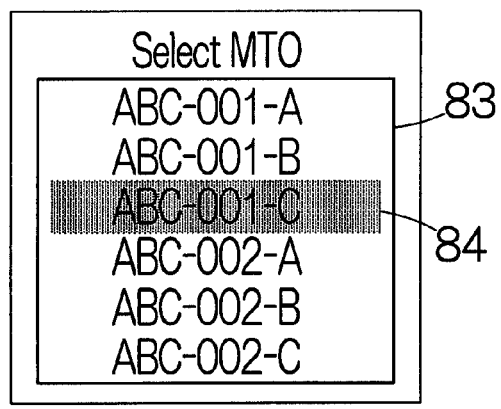
FIG. 13 is a schematic view illustrating an example of an image based on the manual starting control file.

The CPU 21 generates images based on the material image data 44. As shown in FIG. 13, the generated images are displayed on the screen of the display apparatus 14, for example. Here, the file name 43 serves to identify the list file 59 for generation of the images. A list 83 of "Model Type Option Code Number" is displayed based on the list file 59. The "Row No. 0" is designated in the manual starting control file 28, so that all the description appears in English within the screen. The operator is allowed to select the specific "Model Type Option Code Number" 84 in the list 83. The upward keypad 16a and the downward keypad 16b may be manipulated to select the specific "Model Type Option Code Number".

The CPU 21 obtains the process sequence file 32a, 32b, 32c, 32d or 32e from the storage apparatus 22 in response to the selection of the operator at step S6. If "ABC-001-C" is selected in the list 83, for example, the CPU 21 obtains the process sequence file "ABC-001-C_step_file_SEQ" 32c from the storage apparatus 22. Here, "ABC-001-C" included in the file name of the process sequence file 32c serves to specify a relationship between the process sequence file "ABC-001-C_step_file_SEQ" 32c and the code number "ABC-001-C". The CPU 21 boots the designated software module based on the extension ".xxx" of the process sequence file 32a-32e. The CPU 21 in this manner opens the process sequence file 32c at step 57. The CPU 21 subsequently allows the quality analyzing apparatus 39 to operate based on the instructions from the process sequence file 32c at step 58.

Here, when the operator has completed the selection, the operator then connects the handy terminal 11 to the vehicle 35. The CPU 21 obtains the "Vehicle Identification Number" through the communication interface 34. The "Vehicle Identification Number" may temporarily be stored in the memory 24, for example.

Figure 14:
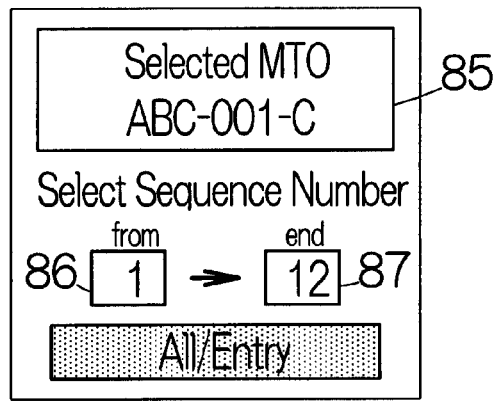
FIG. 14 is a schematic view illustrating an example of an image based on the manual starting control file.
Figure 15:
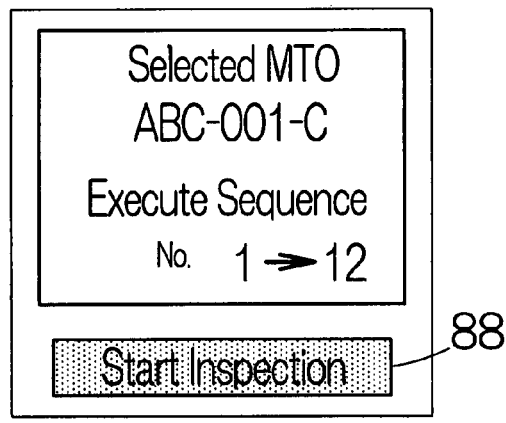
FIG. 15 is a schematic view illustrating an example of an image based on the manual starting control file.

As shown in FIG. 14, the result 85 of the selection is displayed on the screen of the display apparatus 14, for example. The operator is invited to select the inspecting process. The operator may input the first sequence number 86 and the last sequence number 87 for the inspecting process. The operator is in this manner allowed to select a part of the inspecting process. When the selection of the inspecting process has been completed, the operator is notified of the expecting commencement of the inspecting process, as shown in FIG. 15. The selection of "Start Inspection" dialog box 88 allows the commencement of the inspecting process.

The CPU 21 reads out the file names 74 in sequence for the sequence numbers "$1", "$2", "$3" and "$4" from the process sequence file 32c. The CPU 21 sequentially reads out the inspecting software program files 31a-31d based on the file names 74. The CPU 21 executes the inspecting software program files 31a-31d based on the extension ".zzz". For example, the extension ".exe" is added to the file name of the inspecting software program files 31a-31d for Windows®, the operating system 23 distributed from Microsoft Corporation. The CPU 21 generates command signals based on the inspecting software program files 31a-31d.

The CPU 21 uses the parameter files 33a-33d related to the process sequence files 32c for execution of the inspecting software program files 31a-31d. The CPU 21 boots the designated software module based on the extension ".xxx" of the parameter files 33a-33d. The CPU 21 in this manner opens the parameter files 33a-33d. The CPU 21 then determines the specific row number 62 in the parameter files 33a-33d based on the row number 76 in the process sequence files 32a-32d. The CPU 21 reads out a set of the parameters in accordance with the designated row number 62. For example, if the "Row No. 1" is designated in the parameter file "QA1 parameter", the CPU 21 reads out from "QA1 parameter" 33a parameters such as "1100", "32", "72", "−310" and "−360". The CPU 21 generates the aforementioned command signals based on the obtained parameters. The command signals are transmitted to the quality analyzing apparatus 39. The quality analyzing apparatus 39 carries out the analyzing process.

The quality analyzing apparatus 39 supplies inspection signals to electronic apparatuses or devices in the vehicle 35 in response to the reception of the command signals from the CPU 21. The quality analyzing apparatus 39 analyzes the quality of the vehicle 35 based on responses from the electronic apparatuses or devices. Here, the electronic apparatuses or devices include fuel injection systems, on-off switches for lights, open/close switches for door lock, and the like. When the analyzing process has been completed, the quality analyzing apparatus 39 notifies the CPU 21 of the result of the analyzing process. The aforementioned "Vehicle Identification Number" is written into communication data for the notification. The CPU 21 receives the communication data at step S9. The server 41 may collect the results of the analyzing processes.

Figure 16:
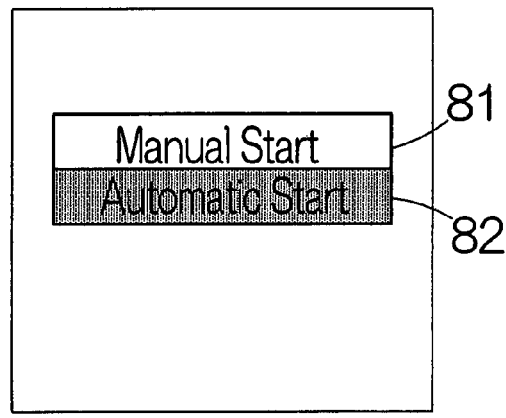
FIG. 16 is a schematic view illustrating an example of an image based on the main control file.

Now, assume that "Automatic Start" 82 is selected on the screen in place of "Manual Start" 81, as shown in FIG. 16. The CPU 21 obtains the automatic starting control file "auto start" 29 from the storage apparatus 22. The CPU 21 boots the designated software module based on the extension ".xxx" of the automatic starting control file 29. The CPU 21 in this manner opens the automatic starting control file "auto start" 29. The CPU 21 then selects the designated row number 45 in the automatic starting control file 29 based on the row number 56 in the main control file 27. The CPU 21 reads out dataset from the row designated by the selected row number 45.

The CPU 21 generates images based on the material image data 48 in the aforementioned manner. As shown in FIG. 13, the list 83 of "Model Type Option Code Number" is displayed based on the list file 59, for example. The "Row No. 0" is designated in the automatic starting control file 29, so that all the description appears in English within the screen. The operator is allowed to select the specific "Model Type Option Code Number" 84 in the list 83. The upward keypad 16a and the downward keypad 16b may be manipulated to select the specific "Model Type Option Code Number".

Figure 17:
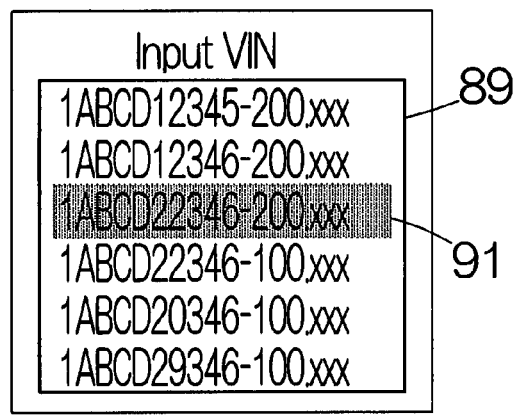
FIG. 17 is a schematic view illustrating an example of an image based on the automatic starting control file.

The CPU 21 subsequently generates images based on the material image data 48. As shown in FIG. 17, a list 89 of "Vehicle Identification Number" is displayed based on the list file 61, for example. The "Row No. 0" is designated in the automatic starting control file 29, so that all the description appears in English within the screen. The operator is allowed to select the specific "Vehicle Identification Number" 891 in the list 89. The upward keypad 16a and the downward keypad 16b may be manipulated to select the specific "Vehicle Identification Number". The process sequence files 32a-32e are subsequently read out of the storage apparatus 22 based on the specific "Model Type Option Code Number" 84.

Figure 18:
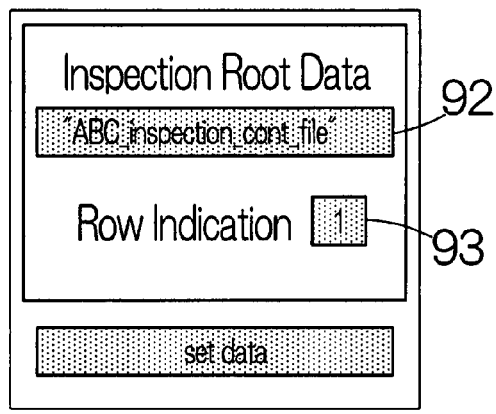
FIG. 18 is a schematic view illustrating an example of an image based on a setup module.
Figure 19:
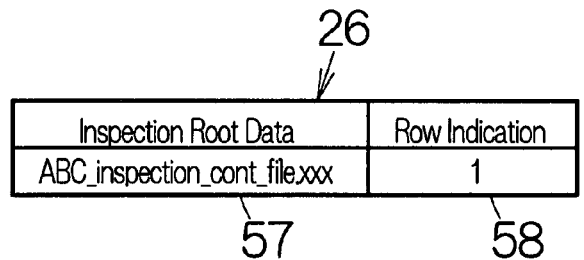
FIG. 19 is a schematic view illustrating the root data file after modification.
Figure 20:
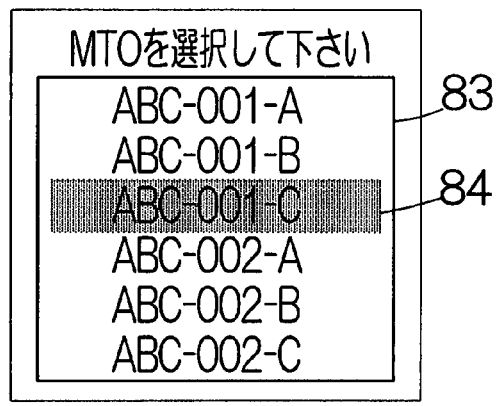
FIG. 20 is a schematic view illustrating an example of an image based on the manual starting control file when Japanese is selected as the language.
Figure 21:
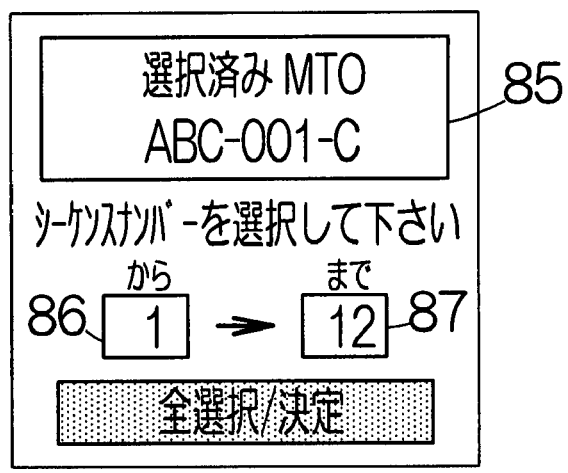
FIG. 21 is a schematic view illustrating an example of an image based on the manual starting control file when Japanese is selected as the language.

Now, assume that the images based on English language are changed to images based on Japanese language on the screen of the display apparatus 14. A predetermined setup module is assembled in the controlling software program 25. When the setup module is booted, the operator of the handy terminal 11 is invited to designate the root data file 92 and the row number 93, as shown in FIG. 18, for example. If the row number 93 is changed to "1" on the screen, as shown in FIG. 19, the row number 58 is changed in the root data file 26. When the controlling software file 25 is executed in the aforementioned manner, the CPU 21 generates images based on the row number "1" in the main control file 27. As a result, all the description appears in Japanese on the screen, as shown in FIG. 20. Moreover, the main control file 27 allows the designation of "1" in the row number 53, 56 of the manual starting control file 28 and the automatic starting control file 29. Accordingly, when images are generated based on the manual starting control file 28 and the automatic starting control file 29, all the description appears in Japanese, as shown in FIG. 21.

Next, assume that a new language is to be registered in the handy terminal 11. The manual starting control file 28 and the automatic starting control file 29 are opened in the predetermined database software, for example. The manual starting control file 28 and the automatic starting control file 29 may be opened on a personal computer, for example. As shown in FIGS. 3 and 4, data is displayed in the spreadsheet on the screen of the personal computer, for example. The operator may input data corresponding to a specific language into the material image data 44, 48 in a specific "row". The main control file 27 is then opened on the personal computer. The operator may input data corresponding to the specific language into the material image data 51, 54 in the specific "row". The row numbers 42, 45 of the manual starting control file 28 and the automatic starting control file 29 may be input into the row numbers 53, 56. The controlling software program 25 in this manner allows application to any languages.

A predetermined database software may be used to open the process sequence files 32a-32e for change of the parameters. The row number 76 may be changed in the process sequence files 32a-32e for the individual parameter file 33a-33e. For example, if the row number 76 for the parameter file "QA1 parameter" is changed to "2" in the process sequence, files 32a-32e, the CPU 21 reads out the parameters of "spring version" such as "1,080", "28", "70", "−310" and "−340" from the parameter file "QA1 parameter" during the execution of the inspecting software program file 31a. In addition, the parameter files 33a-33e accept change of values in the parameters. A predetermined database software may be used to open the parameter files 33a-33e for the change of the parameters. The parameters useful to the execution of the inspecting software program files 31a-31e can in this manner be changed in a relatively facilitated manner.

A predetermined database software may likewise be used to open the process sequence files 32a-32e for change of the sequence of processes. The process sequence files 32a-32e may accept not only change of the "Sequence Number" 68 but also change of the file name 74 of "program file". The sequence of the execution of the inspecting software program files 31a-31e can be changed based on the change of "Sequence Number" and/or the file name 74 in a relatively facilitated manner. For example, if a new program file having a new file name is registered in the storage apparatus 22, a simple change of the file name 74 in the process sequence files 32a-32e allows change in the sequence of the inspecting software program files 31a-31e in an easier manner.

The vehicle quality analyzing system allows utilization of a set of independent files for establishment of the data structure. Only a description in a single file is utilized to establish the relationship of data between a plurality of files. A multi-layered data structure can be established in a relatively facilitated manner.

Moreover, the vehicle quality analyzing system allows separate management of data in the individual file. Only the target file may be opened for change of data. Since the individual file may have a data volume of a relatively small amount, the operator is allowed to enjoy a reduced working operation. On the other hand, if the individual data is incorporated in a software program file in a conventional manner, it is troublesome for the operator to even find out a target data to be subjected to a change in the software program file. In addition, the vehicle quality analyzing system allows employment of a spreadsheet in a file for display of data. A general-purpose database software may be employed to manage the file. The operator is allowed to work on the file with an accustomed user interface.

It should be noted that the electronic apparatuses or devices mounted on the aforementioned vehicle 35 may include any kind of hardware, instruments, circuit, and the like, operating based on supplied electric signal and/or electric wave.

The invention claimed is:

1. A vehicle quality analyzing system comprising:
a first storage apparatus holding a first data file including a first spreadsheet type database prepared based on a software, the first data file including a program file identifier, a data file identifier and row number information, the program file identifier identifying at least a program file, the data file identifier identifying a second data file, and the row number information specifying a row number in the second data file;
a second storage apparatus holding the second data file including a second spreadsheet type database prepared based on a software, the second data file including a plurality of data sorted by the row number for respective program files;
a processing unit generating specific instructions based on the first and second data files; and
a quality analyzing apparatus supplying an electronic apparatus in a vehicle with a predetermined signal based on the specific instructions of the processing unit, the quality analyzing apparatus analyzing quality of the vehicle based on a response from the electronic apparatus, wherein
the processing unit obtains from the first data file the program file identifier, the data file identifier and the row number information, obtains data related to the program file from the second data file based on the data file identifier and the row number so as to execute the program file.

2. The vehicle quality analyzing system according to claim 1, wherein the first data file is overwritable based on the software.

3. The vehicle quality analyzing system according to claim 1, wherein the second data file is overwritable based on the software.

4. The vehicle quality analyzing system according to claim 1, wherein the software is a spreadsheet software.

5. The vehicle quality analyzing system according to claim 2, wherein the software is a spreadsheet software.

6. The vehicle quality analyzing system according to claim 3, wherein the software is a spreadsheet software.

* * * * *